US006657639B2

United States Patent
Yu

(10) Patent No.: US 6,657,639 B2
(45) Date of Patent: Dec. 2, 2003

(54) APPARATUS AND METHOD FOR IMPROVED SCROLLING

(75) Inventor: Seong Ryol Yu, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 191 days.

(21) Appl. No.: 09/957,500

(22) Filed: Sep. 20, 2001

(65) Prior Publication Data

US 2003/0052902 A1 Mar. 20, 2003

(51) Int. Cl.[7] .................................. G09G 5/00
(52) U.S. Cl. ......................... 345/684; 345/786
(58) Field of Search .................. 345/684, 685, 345/786, 787

(56) References Cited

U.S. PATENT DOCUMENTS

| | | | |
|---|---|---|---|
| 5,726,687 A | 3/1998 | Belfiore et al. | 345/341 |
| 5,745,100 A | 4/1998 | Bates et al. | 345/157 |
| 5,805,161 A | * 9/1998 | Tiphane | 345/786 |
| 5,874,936 A | 2/1999 | Berstis et al. | 345/123 |
| 6,191,785 B1 | 2/2001 | Bertram et al. | 345/341 |
| 6,384,845 B1 | * 5/2002 | Takaike | 345/786 |

* cited by examiner

Primary Examiner—Matthew Luu
(74) Attorney, Agent, or Firm—David A. Mims, Jr.; Rudolf O. Siegesmund

(57) ABSTRACT

An improved apparatus and method for scrolling through text contained in windows on a graphical user interface is disclosed. The invention determines whether the user is holding down a command button while the mouse pointer is either placed over the slider on a scroll bar or over one of the directional buttons. If the pointer is on the vertical slider, the invention ignores left and right mouse movements. If the pointer is on the horizontal slider, the invention ignores up and down mouse movements. If the pointer is on one of the four directional arrows, the invention ignores all mouse movements. The invention will continue along these guidelines until the command button is released. By performing these tasks, the invention eliminates the possibility that a user will inadvertently move the pointer off of the scroll bar or off of the directional buttons. In an alternate embodiment, the invention uses two buttons, a freeze button and the command button, where upon a clicking of the freeze button, the command button may be used repeatedly to activate a directional button until the freeze button is clicked a second time.

45 Claims, 4 Drawing Sheets

APPARATUS AND METHOD FOR IMPROVED SCROLLING

FIELD OF INVENTION

The present invention relates to an apparatus and method for scrolling through information in the window of a graphical user interface of a computer.

BACKGROUND

The most common method of scrolling through text in a graphical user interface using a windows type format is to use the horizontal and vertical scroll bars. A typical vertical scroll bar apparatus contains up and down directional buttons and a vertically oriented track having a slider. A typical horizontal scroll bar contains left and right directional buttons and a horizontally oriented track having a slider. The user can scroll through the text by using the pointer to drag the slider along either the horizontal or vertical track, or by depressing any of the four directional buttons. The user can also page up or down through the text by clicking on the track above or below the slider on the vertical scroll bar. Alternatively, the user can page left or right through the text by clicking on the track to the left or right of the slider on the horizontal scroll bar.

Problems arise when the user attempts to scroll through the text and inadvertently moves the pointer off of the slider or off of one of the directional buttons. When this happens, the scrolling stops suddenly and the screen returns to the point where the cursor is placed. Often, the cursor is placed at a position within the text that is not visible on the current screen and the screen jumps back to the cursor. This delays and disrupts the process of scrolling and is particularly problematic when the action of maneuvering the mouse is difficult, as is the case with some notebook computers or as is the case with a mouse with worn components. Therefore, a need exists for an apparatus and method for scrolling through text in windows that will prevent the user from inadvertently moving the pointer off of the scrolling bar.

U.S. Pat. No. 6,191,785 issued to Bertram et al. (hereinafter Bertram) discloses a "Method And System For Dynamically Manipulating Values Associated With Graphical Elements Displayed Within A Graphical User Interface" which addresses the problem of inadvertently moving the pointer off of the slider. Bertram avoids inadvertent movement off of the slider by teaching the use of one click (depress and release) of a button to attach the pointer to the slider, transference of motion of the pointer into corresponding scrolling through the text limited in the direction of the scroll bar (i.e. only horizontal or vertical, depending on the particular scroll bar selected), and using a second click of the button to disconnect the pointer from the slider.

What is needed beyond the prior art is a pointer that may be attached to either the sliders or the directional buttons. What is further needed is a pointer that may be attached and disengaged with only one button click.

SUMMARY OF INVENTION

The present invention meets the needs stated above by providing an improved apparatus and method for scrolling through text contained in windows on a graphical user interface. The invention determines whether the user is holding down a command button while the mouse pointer is either placed over the slider on a scroll bar or over one of the directional buttons. If the pointer is on the vertical slider, the invention ignores left and right mouse movements. If the pointer is on the horizontal slider, the invention ignores up and down mouse movements. If the pointer is on one of the four directional arrows, the invention ignores all mouse movements. The invention will continue along these guidelines until the command button is released. By performing these tasks, the invention eliminates the possibility that a user will inadvertently move the pointer off of the scroll bar or off of the directional buttons. In an alternate embodiment, the invention uses two buttons, a freeze button and the command button, where upon a clicking of the freeze button, the command button may be used repeatedly to activate a directional button until the freeze button is clicked a second time. The foregoing and other objects, features, and advantages of the invention will be apparent from the following more particular description of the preferred embodiment of the invention, as illustrated in the accompanying drawings wherein like reference numbers represent like parts of the invention.

DESCRIPTION OF PREFERRED EMBODIMENTS

Figure 1:
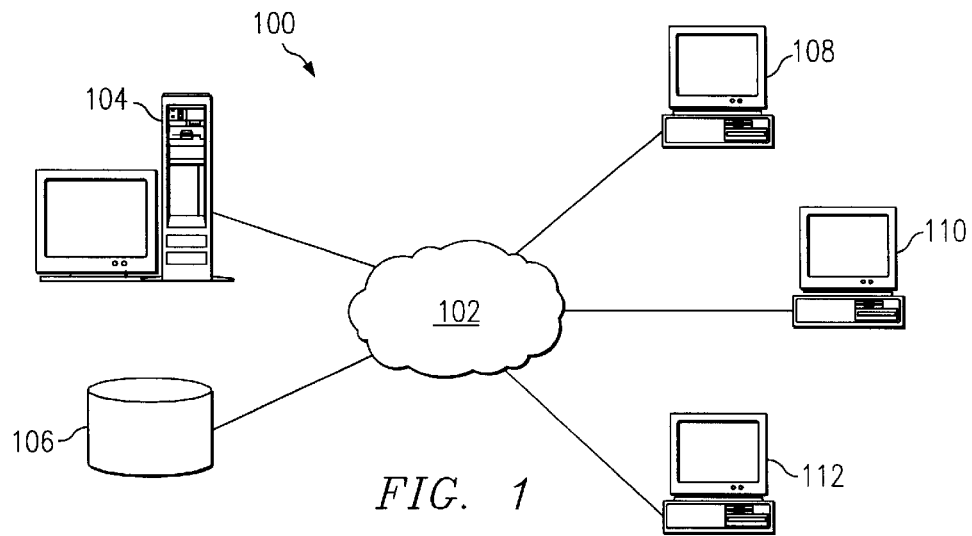
FIG. 1 is depiction of a distributed data processing system.

FIG. 1 depicts a pictorial representation of a distributed data processing system in which the present invention may be implemented and is intended as an example, and not as an architectural limitation, for the processes of the present invention. Distributed data processing system 100 is a network of computers which contains a network 102, which is the medium used to provide communication links between the various devices and computers connected together within distributed data processing system 100. Network 102 may include permanent connections, such as wire or fiber optic cables, or temporary connections made through telephone connections. In the depicted example, a server 104 is connected to network 102 along with storage unit 106. In addition, clients 108, 110, and 112 also are connected to a network 102. Clients 108, 110, and 112 may be, for example, personal computers or network computers.

For purposes of this application, a network computer is any computer, coupled to a akin network, which receives a program or other application from another computer coupled to the network. In the depicted example, server 104 provides Web based applications to clients 108, 110, and 112. Clients 108, 110, and 112 are clients to server 104. Distributed data processing system 100 may include additional servers, clients, and other devices not shown. In the depicted example, distributed data processing system 100 is the Internet with network 102 representing a worldwide collection of networks and gateways that use the TCP/IP suite of protocols to communicate with one another. Distributed data processing system 100 may also be implemented as a number of different types of networks, such as, an intranet, a local area network (LAN), or a wide area network (WAN).

Figure 2:
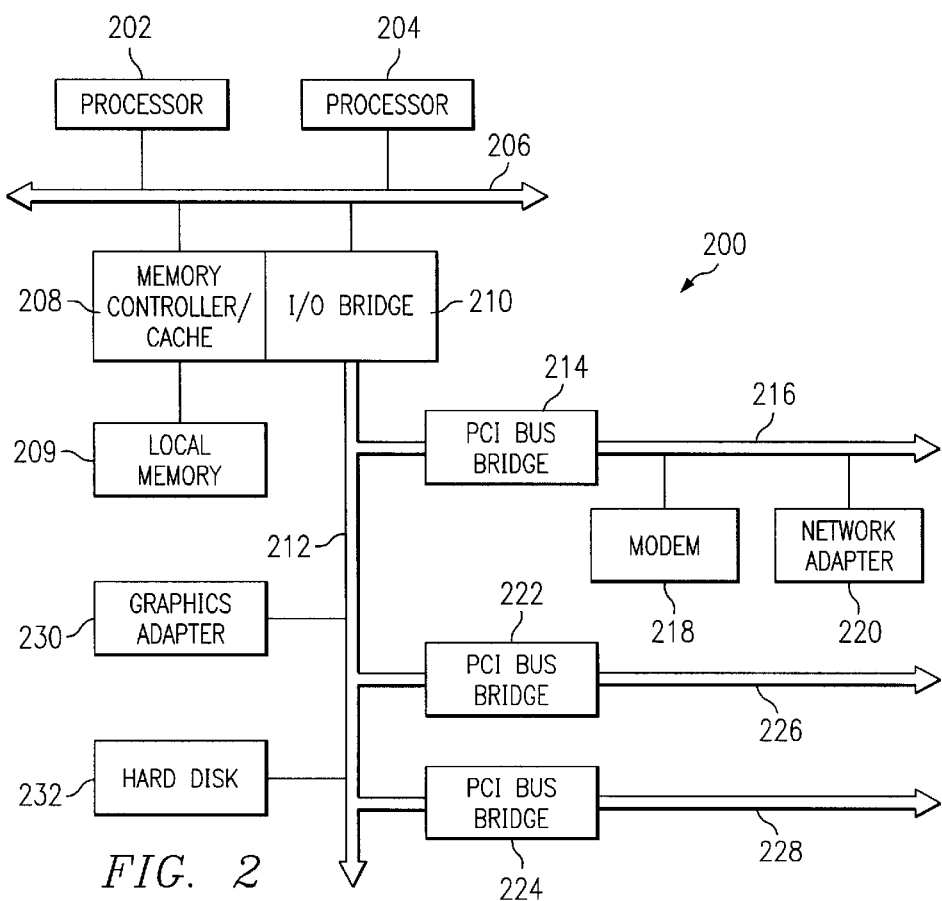
FIG. 2 is a depiction of a server computer.

Referring to FIG. 2, a block diagram depicts a data processing system, which may be implemented as a server, such as server 104 in FIG. 1 in accordance with the present invention. Data processing system 200 may be a symmetric multiprocessor (SMP) system including a plurality of processors such as first processor 202 and second processor 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to V/O bus 212 provides an interface to first PCI local bus 216. Modem 218 may be connected to first PCI bus local 216. Typical PCI bus implementations will support four PCI expansion slots or add-in connectors. Communications links to network computers 108, 110 and 112 in FIG. 1 may be provided through modem 218 and network adapter 220 connected to first PCI local bus 216 through add-in boards. Additional PCI bus bridges such as second PCI bus bridge 222 and third PCI bus bridge 224 provide interfaces for additional PCI local buses such as second PCI local bus 226 and third PCI local bus 228, from which additional modems or network adapters may be supported. In this manner, server 200 allows connections to multiple network computers. A memory-mapped graphics adapter 230 and hard disk 232 may also be connected to I/O bus 212 as depicted, either directly or indirectly. Those of ordinary skill in the art will appreciate that the hardware depicted in FIG. 2 may vary. For example, other peripheral devices, such as an optical disk drive and the like also may be used in addition or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
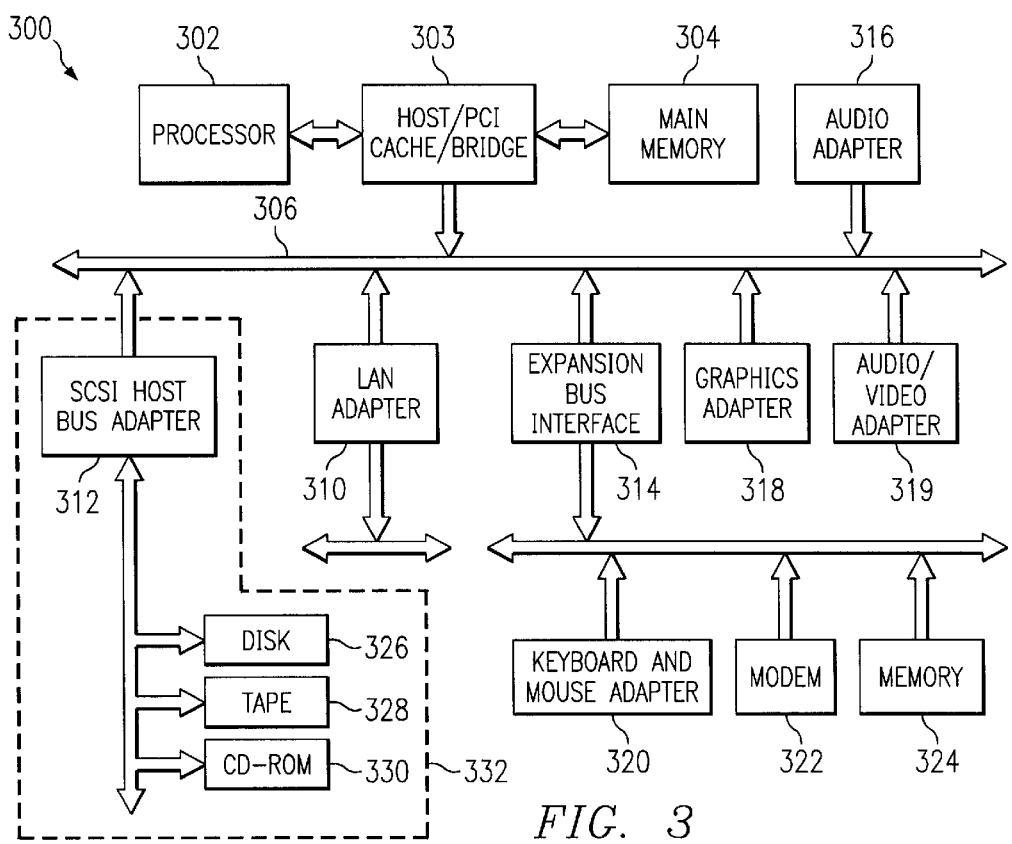
FIG. 3 is a depiction of a client computer.

With reference now to FIG. 3, a block diagram illustrates a data processing system in which the invention may be implemented. Data processing system 300 is an example of either a stand-alone computer, if not connected to distributed data processing system 100, or a client computer, if connected to distributed data processing system 100. Data processing system 300 employs a peripheral component interconnect (PCI) local bus architecture. Although the depicted example employs a PCI bus, other bus architectures such as Micro Channel and ISA may be used. Processor 302 and main memory 304 are connected to PCI local bus 306 through PCI bridge 303. PCI bridge 303 also may include an integrated memory controller and cache memory for Processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and audio/video adapter (ANV) 319 are connected to PCI local bus 306 by add-in boards inserted into expansion slots. Expansion bus interface 314 provides a connection for a keyboard and mouse adapter 320, modem 322, and additional memory 324. SCSI host bus adapter 312 provides a connection for hard disk drive 326, tape drive 328, and CD-ROM 330 in the depicted example. Typical PCI local bus implementations will support three or four PCI expansion slots or add-in connectors. An operating system runs on processor 302 and is used to coordinate and provide control of various components within data processing system 300 in FIG. 3. The operating system may be a commercially available operating system such as OS/2, which is available from International Business Machines Corporation. "OS/2" is a trademark of International Business Machines Corporation. An object oriented programming system, such as Java, may run in conjunction with the operating system and provides calls to the operating system from Java programs or applications executing on data processing system 300. "Java" is a trademark of Sun Microsystems, Incorporated. Instructions for the operating system, the object-oriented operating system, and applications or programs may be located on storage devices, such as hard disk drive 326, and they may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3. Also, the processes of the present invention may be applied to a multiprocessor data processing system. For example, data processing system 300, if configured as a network computer, may not include SCSI host bus adapter 312, hard disk drive 326, tape drive 328, and CD-ROM 330, as noted by the box with the dotted line in FIG. 3 denoting optional inclusion. In that case, the computer, to be properly called a client computer, must include some type of network communication interface, such as LAN adapter 310, modem 322, or the like. As another example, data processing system 300 may be a stand-alone system configured to be bootable without relying on some type of network communication interface, whether or not data processing system 300 comprises some type of network communication interface. As a further example, data processing system 300 may be a Personal Digital Assistant (PDA) device which is configured with ROM and/or flash ROM in order to provide non-volatile memory for storing operating system files and/or user-generated data. The depicted example in FIG. 3 and above-described examples are not meant to imply architectural limitations with respect to the present invention. It is important to note that while the present invention has been described in the context of a fully functioning data processing system, those of ordinary skill in the art will appreciate that the processes of the present invention are capable of being distributed in a form of a computer readable medium of instructions and a variety of forms and that the present invention applies equally regardless of the particular type of signal bearing media actually used to carry out the distribution. Examples of computer readable media include recordable-type media, such a floppy disc, a hard disk drive, a RAM, and CD-ROMs, and transmission-type media, such as digital and analog communications links.

Figure 4:
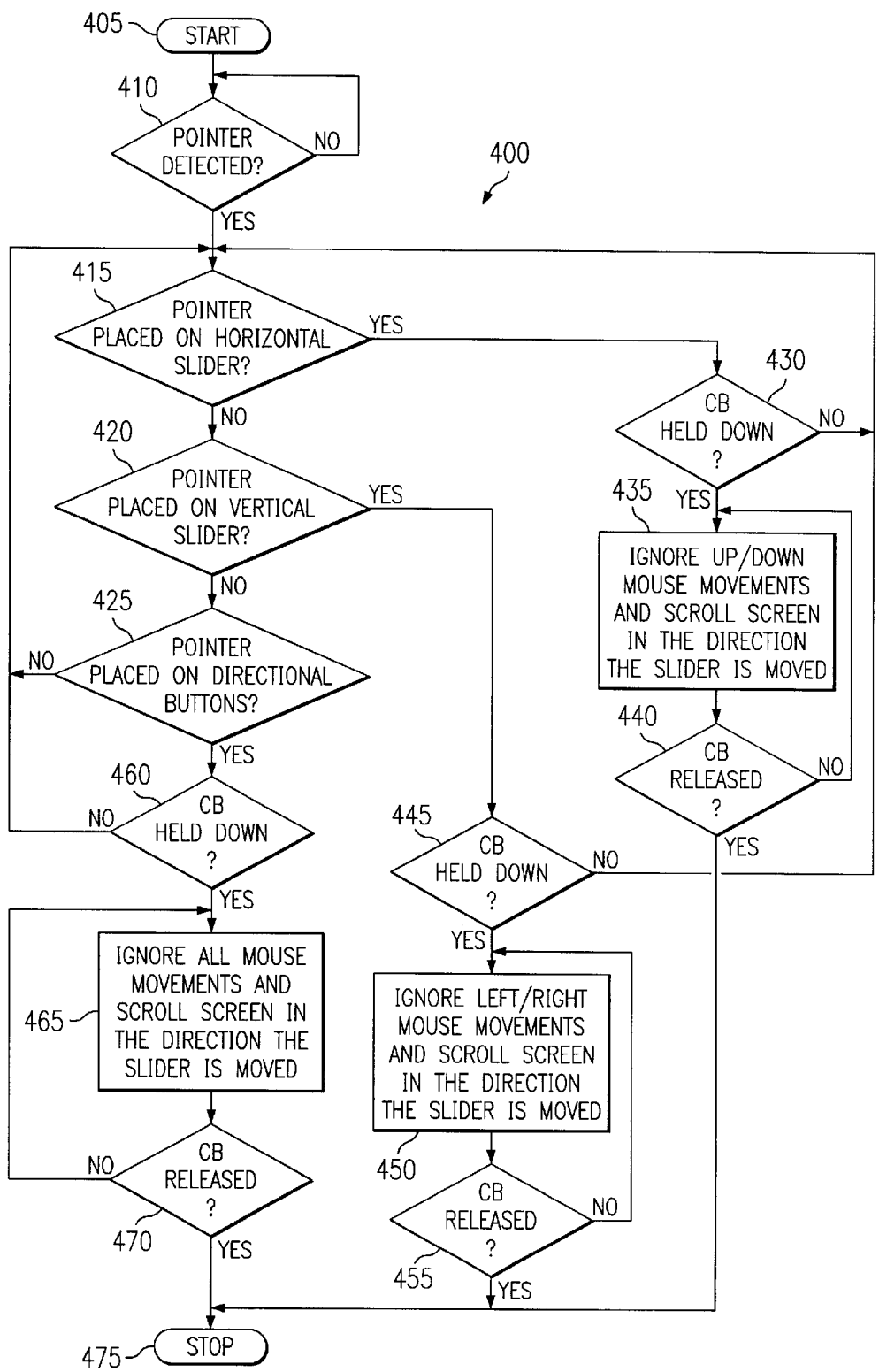
FIG. 4 is a flowchart of the improved scrolling process.

FIG. 4 depicts a flow diagram for an Improved Scrolling Program (ISP) 400. As used herein, the term command button (CB) shall mean a device used to request or initiate an action. In the preferred embodiment, CB is the left mouse button. Persons skilled in the art are aware that the invention is not limited to the left mouse button and may include additional mouse buttons, mechanical input devices or voice commands. The program starts (405) and awaits detection of a pointer (410). Upon detection of a pointer at step 410, the program determines whether the pointer is placed on the horizontal slider (415). If the pointer is placed on the horizontal slider, the program determines if CB is being held down (430). If a determination is made that CB is not being held down, then the program returns to step 415. If CB is being held down, then the program ignores up and down movements from the mouse and scrolls the screen in the direction that the slider has been moved (435). The left and right movements will move the slider along the track in either a left direction or a right direction and will scroll the text in the direction that the slider has been moved. In this manner, ISP 400 prohibits vertical motion of the pointer and the pointer will remain on the slider. ISP 400 will then determine if CB has been released (440). If CB is still being held down, ISP 400 returns to step 435. If the program determines that CB has been released, the program stops (475).

If at step 415 ISP 400 determines that the pointer is not on the horizontal slider, ISP 400 determines whether the pointer is placed on the vertical slider (420). If the pointer is placed on the vertical slider, ISP 400 determines if CB is being held down (445). If CB is not being held down, then ISP 400 returns to step 415. If CB is being held down, then ISP 400 ignores left and right movements from the mouse and scrolls the screen in the direction of the slider (450). The up and down movements of the pointer will move the slider along the track in either an up direction or a down direction and will scroll the text in the direction that the slider has been moved. In this manner, ISP 400 prohibits horizontal motion of the pointer and the pointer will remain on the slider. ISP 400 will then determine if CB has been released (455). If CB is still being held down, ISP 400 returns to step 450. If ISP 400 determines that CB has been released, the program stops (475).

If at step 420, ISP 400 determines that the pointer is not on the vertical slider, ISP 400 determines whether the pointer is placed on one of the four directional buttons (425). If the pointer is placed on one of the four directional buttons, ISP 400 determines if CB is being held down (460). If CB is not being held down, then ISP 400 returns to step 415. If CB is being held down, then the program ignores all movements of the mouse and scrolls the screen in the direction of the slider (465). In this manner, ISP 400 prohibits all motion of the pointer and the pointer will remain on the directional button. The text is scrolled in the appropriate direction while CB is held down. ISP 400 will then determine if CB has been released (470). If CB is still being held down, ISP 400 returns to step 465. As long as the pointer is on the directional button and CB is held down, the text will continue to scroll in the direction indicated by the directional button until CB is released. If ISP 400 determines that the command button has been released, the program stops (475).

Figure 5:
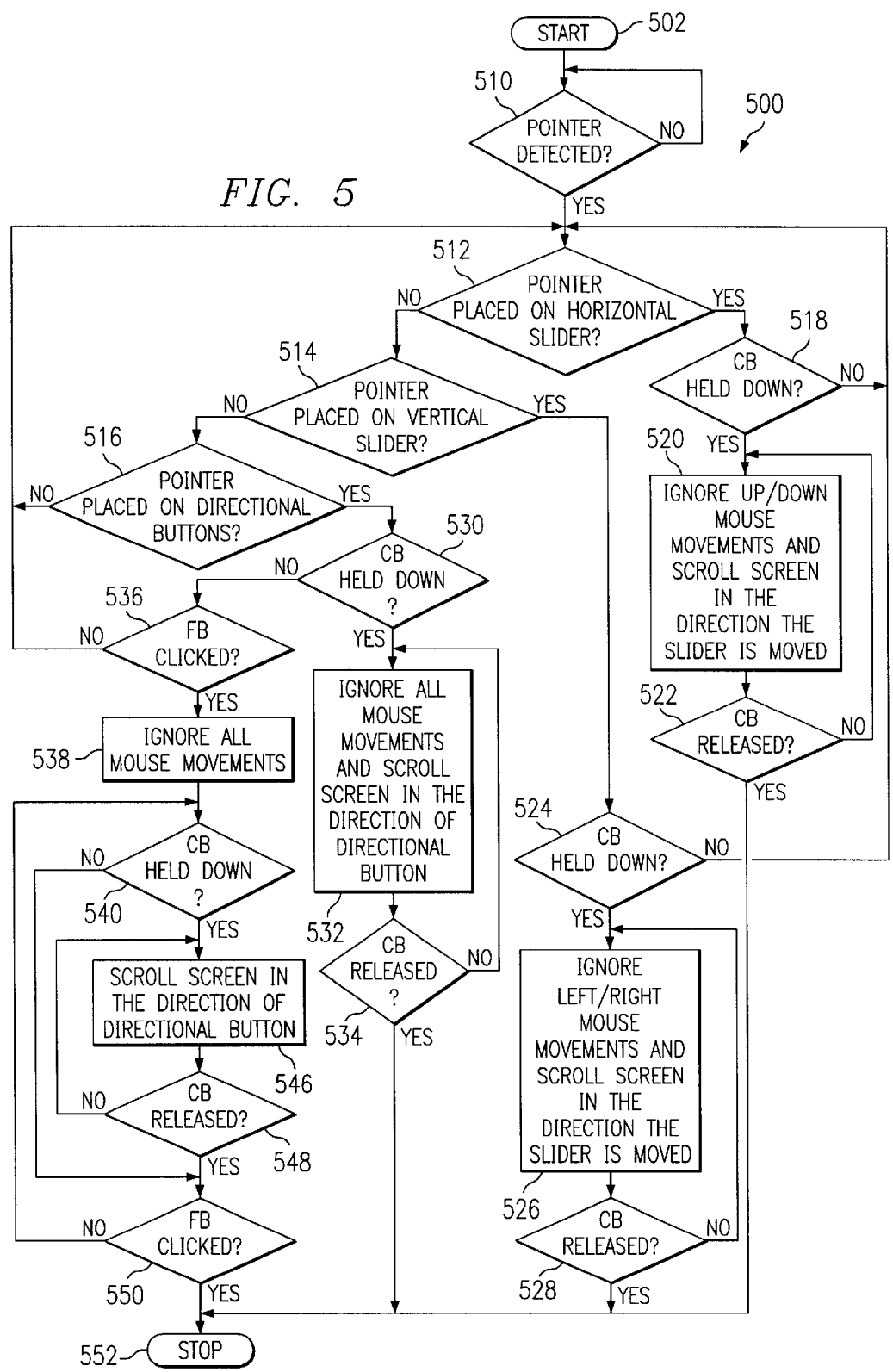
FIG. 5 is a flowchart of an alternative embodiment of the improved scrolling process.

FIG. 5 depicts a flow diagram for Alternate Improved Scrolling Program (AISP) 500. As used herein the term freeze button (FB) shall mean a device used to fix the position of a pointer over a display button that can be clicked to request or initiate an action so that the display button can be clicked repeatedly by a command button (CB). In the preferred embodiment, FB is the right mouse button. Persons skilled in the art are aware that the invention is not limited to the right mouse button and may include additional mouse buttons, mechanical input devices or voice commands. AISP 500 starts (502) and awaits detection of a pointer (510). Upon detection of a pointer at step 510, AISP 500 determines whether the pointer is placed on the horizontal slider (512). If the pointer is placed on the horizontal slider, AISP 500 determines if CB is being held down (518). If CB is not being held down, then AISP 500 returns to step 512. If CB button is being held down, then AISP 500 ignores up and down movements of the mouse and scrolls the screen in the direction of the slider (535). AISP 500 only responds to left and right movements of the mouse. The left and right movements of the mouse will move the slider along the track in either a left direction or a right direction and, responsive to movement of the slider along the track in either a left or right direction, the screen will scroll in the corresponding direction. In this manner, AISP 500 prohibits vertical motion of the pointer and the pointer will remain on the slider. AISP 500 will then determine if CB has been released (522). If CB is still being held down, AISP 500 returns to step 520. If AISP 500 determines that CB has been released, AISP 500 stops (552).

If at step 512, AISP 500 determines that the pointer is not on the horizontal slider, AISP 500 determines whether the pointer is placed on the vertical slider (514). If the pointer is placed on the vertical slider, AISP 500 determines if CB is being held down (524). If CB is not being held down, then AISP 500 returns to step 512. If CB is being held down, then AISP 500 ignores left and right movements of the mouse and scrolls the screen in the direction of the slider. AISP 500 only responds to up and down movements of the mouse (526). The up and down movements will move the slider along the track in either an up direction or a down direction and scroll the text in the appropriate direction. In this manner, AISP 500 prohibits horizontal motion of the pointer and the pointer will remain on the slider. AISP 500 will then determine if CB has been released (528). If CB is still being held down, AISP 500 returns to step 526. If AISP 500 determines that CB has been released, AISP 500 stops (552).

If at step 514, AISP 500 determines that the pointer is not on the vertical slider, the program determines whether the pointer is placed on one of the four directional buttons (516). If the pointer is placed on one of the four directional buttons, AISP 500 determines if the CB is held down (530). If at step 530 CB is not held down, then AISP 500 goes to step 536 and a determination is made as to whether FB has been clicked (536). If at step 536, FB has not been clicked, then AISP 500 returns to step 512. If at step 536 FB is clicked, then AISP 500 ignores all mouse movements (538). A determination is made as to whether CB is held down (540). If CB is being held down, the AISP 500 scrolls the screen in the direction of the directional button (546). Next, a determination is made as to whether CB has been released (548). If CB has been released, then a determination is made as to whether FB has been clicked (550). If FB has not been clicked, then AISP 500 goes to step 540. If FB has been clicked, the AISP 500 stops (552).

If at step 530, a determination is made that CB is held down, then AISP 500 ignores all mouse movements and scrolls the screen in the direction of the directional button. A determination is made as to whether CB has been released (534). If CB has been released, then AISP 500 stops (552). If CB has not been released, then AISP 500 goes to step 532.

The preferred embodiment involving the invention that utilizes both vertical and horizontal scroll bars is meant for illustrative purposes only and is not intended to be a limitation on the present invention. In alternative embodiments, the invention may contain only a horizontal scrollbar, a vertical scrollbar, or any number of directional buttons. The present invention which prohibits motion of the pointer could also be applied when the pointer is on the scroll bar track instead of on the slider such that the screen will page up, down, left, or right. Alternatively, the directional button could be the page up, page down, page left, or page right buttons found next to the horizontal and vertical scroll bars.

The present invention is also not limited to applications involving the scrolling of data in a window. The present invention can be applied to sliders or buttons on brightness, contrast, or volume controls on a computer or a computer application. The present invention could also be applied to drop down menus on web pages or windows based applications. Additionally, the act of depressing a mouse button to activate the program is illustrative as well. The command button to activate the program could be located on a keyboard, notebook computer keyboard, trackball, or other user input device known to persons skilled in the art. Additionally, the freeze button could be located on a keyboard, notebook computer keyboard, trackball or some other user input device known to persons skilled in the art. Also, there are many different devices that may be used to position the pointer including a mouse, a trackball, a keyboard, a touchpad, or a trackpoint on a laptop.

It will be understood from the foregoing that various modifications and changes may be made in the preferred embodiment of the present invention by those skilled in the art without departing from its true spirit. It is intended that this description is for purposes of illustration only and should not be construed in a limiting sense. The scope of the invention should be limited only by the language of the following claims.

What is claimed is:

1. A method for improving the action of scrolling on a graphical user interface comprising:
    positioning a pointer on an object;
    receiving a movement command for the pointer from a user input device;
    ignoring the movement command for the pointer from a user input device while a command button is depressed; and
    obeying the movement command for the pointer from the user input device once the command button has been released.

2. The method in claim 1 where the object is a horizontal slider.

3. The method in claim 2 where the movement command is a vertical movement command.

4. The method in claim 1 where the object is a vertical slider.

5. The method in claim 1 where the movement command is a horizontal movement command.

6. The method in claim 1 where the object is a horizontal track.

7. The method in claim 6 where the movement command is a vertical movement command.

8. The method in claim 1 where the object is a vertical track.

9. The method in claim 8 where the movement command is a horizontal movement command.

10. The method in claim 1 where the object is a directional button.

11. The method in claim 10 where the movement command comprises vertical and horizontal movement commands.

12. A programmable apparatus for improving the action of scrolling on a graphical user interface comprising:
    a processor;
    a memory;
    a program in the memory;
    the programmable hardware being directed by the program to;
        position a pointer on an object;
        receive a movement command for the pointer from a user input device;
        ignore the movement command for the pointer from a user input device while
    a command button is depressed; and
        obey the movement command for the pointer from the user input device once the command button has been released.

13. The programmable apparatus of claim 12 where the object is a horizontal slider.

14. The programmable apparatus of claim 13 where the movement command is a vertical movement command.

15. The programmable apparatus of claim 12 where the object is a vertical slider.

16. The programmable apparatus of claim 15 where the movement command is a horizontal movement command.

17. The programmable apparatus of claim 12 where the object is a horizontal track.

18. The programmable apparatus of claim 17 where the movement command is a vertical movement command.

19. The programmable apparatus of claim 12 where the object is a vertical track.

20. The programmable apparatus of claim 19 where the movement command is a horizontal movement command.

21. The programmable apparatus of claim 12 where the object is a directional button.

22. The programmable apparatus of claim 21 where the movement command comprises vertical and horizontal movement commands.

23. A computer readable memory for causing a computer to improve the action of scrolling on a graphical user interface comprising:
    a computer readable storage medium;
    a computer program stored in the storage medium;
    wherein the storage medium, so configured by said computer program, causes the computer to:
        position a pointer on an object;
        receive a movement command for the pointer from a user input device;
        ignore the movement command for the pointer from a user input device while a command button is depressed; and
        obey the movement command for the pointer from the user input device once the command button has been released.

24. The computer readable memory of claim 23 where the object is a horizontal slider.

25. The computer readable memory of claim 24 where the movement command is a vertical movement command.

26. The computer readable memory of claim 23 where the object is a vertical slider.

27. The computer readable memory of claim 26 where the movement command is a horizontal movement command.

28. The computer readable memory of claim 23 where the object is a horizontal track.

29. The computer readable memory of claim 28 where the movement command is a vertical movement command.

30. The computer readable memory of claim 23 where the object is a vertical track.

31. The computer readable memory of claim 30 where the movement command is a horizontal movement command.

32. The computer readable memory of claim 23 where the object is a directional button.

33. The computer readable memory of claim 32 where the movement command comprises vertical and horizontal movement commands.

34. A method comprising:
    positioning a pointer on a directional button;

ignoring a movement command for the pointer from a user input device when a first command button has been clicked; and obeying the movement command for the pointer from the user input dovice when the first command button has been clicked a second time.

35. The method of claim 34 further comprising: receiving the movement command for the pointer from the user input device.

36. The method of claim 34 further comprising: pressing a second command button and activating the directional button.

37. The method of claim 36 wherein the first command button is a right mouse button and the second command button is a left mouse button.

38. The method of claim 36 wherein the first command button is a left mouse button and the second command button is a right mouse button.

39. The method of claim 34 wherein the movement command comprises vertical and horizontal movement commands.

40. A program product operable on a computer, the program product comprising:

a computer-usable medium;

wherein the computer usable medium comprises instructions comprising:

instructions for positioning a pointer on a directional button;

instructions for ignoring a movement command for the pointer from a user input device when a first command button has been clicked; and instructions for obeying the movement command for the pointer from the user input device when the first command button has been pressed a second time.

41. The program product of claim 40 further comprising: instructions for receiving the movement command for the pointer from the user input device.

42. The program product of claim 40 further comprising: instructions for pressing a second command button and activating the directional button.

43. The program product of claim 42 wherein the first command button is a right mouse button and the second command button is a left mouse button.

44. The program product of claim 42 wherein the first command button is a left mouse button and the second command button is a right mouse button.

45. The program product of claim 40 wherein the movement command comprises vertical and horizontal movement commands.

* * * * *